Patented Dec. 2, 1952

2,620,326

UNITED STATES PATENT OFFICE 2,620,326

INSOLUBLE POLYSTYRENE DERIVATIVE FROM AN AMMONIUM SALT OF SULFONATED POLYSTYRENE AND FORMALDEHYDE

Joel Fantl, Springfield, Mass., assignor to Monsanto Chemical Company, St. Louis, Mo., a corporation of Delaware No Drawing. Application May 29, 1951, Serial No. 228,989

6 Claims. (Cl. 260—73)

This invention relates to water-insoluble derivatives of sulfonated polystyrene and to a process for preparing them.

Polystyrene has been sulfonated by various methods such as by reaction with sulfuric acid, chlorosulfonic acid, sulfur trioxide, etc. Some of these processes yield polystyrene polysulfonic acids which are water-soluble and others yield water-insoluble materials. In some cases, the insoluble polystyrene sulfonic acids may be rendered water-soluble by forming the ammonium or alkali metal salts thereof.

The water-soluble salts of polystyrene polysulfonic acids may be formed into fibers, films, etc. from aqueous solutions thereof by casting and extruding operations which involve evaporation of the aqueous medium. The products are water-soluble and are adversely affected by humid conditions.

One object of this invention is to provide water-insoluble films and fibers of modified water-soluble salts of polystyrene polysulfonic acids.

Another object is to provide a process for insolubilizing water-soluble salts of polystyrene polysulfonic acids.

These and other objects are attained by adding formaldehyde to aqueous solutions of the ammonium salt of polystyrene polysulfonic acids, forming films or fibers from said solutions, and thereafter removing the water from said solutions.

The following examples are given in illustration and are not intended as limitations of the scope of this invention. Where parts are mentioned, they are parts by weight.

Example I

A solution was prepared by dissolving in 100 parts of water, 10 parts of the ammonium salt of a polystyrene polysulfonic acid having a molecular weight of about 70,000 and containing an average of 1.2 sulfonic acid groups per styrene unit. To this solution, 6.7 parts of formalin (37% formaldehyde) were added. A film about 0.0005" thick was cast from this solution onto a glass plate. The film was heated at about 75° C. until it was dry. The dried film was strong and clear. It was substantially insoluble in water and was infusible. A surprising property of the film was that it would not support combustion, i. e., it would char when held in an open flame but would not catch fire and continue burning when withdrawn from the flame.

Fibers and filaments may be prepared from the solution of Example I by extruding the solution through minute orifices into a gaseous medium such as air heated to temperatures above 50° C.

The polystyrene polysulfonic acids may be prepared from polystyrene having a molecular weight, as determined by the Staudinger method, of from 10,000 to 500,000. The polymer may be sulfonated by reacting it with sulfuric acid, chlorosulfonic acid, sulfur trioxide, etc. Methods which provide excellent control of the sulfonation reaction and which provide water-soluble polystyrene polysulfonic acids are disclosed in U. S. Patents 2,533,210 and 2,533,211.

The ammonium salts of polystyrene polysulfonic acids made by any one of the above methods are at least partially soluble in water. Those compounds in which there are an average of from 0.5 to 2.0 sulfonic acid groups per styrene unit are completely water-soluble and constitute the preferred compositions of this invention.

The amount of formaldehyde to be used is based on the amount of combined ammonia in the salt and should be from 25% to 100% of the amount necessary to convert the ammonia to hexamethylene tetramine according to the equation

$$6H_2CO + 4NH_3 \rightarrow C_6H_{12}N_4$$

An excess of formaldehyde may be used but the excess does not enter into the reaction and is driven off during the insolubilization step. Based on 100 parts of ammonium polystyrene polysulfonate, the amount of formaldehyde may vary from 3 to 30 parts.

The removal of the water and insolubilization of the ammonium polystyrene sulfonates occurs concurrently at temperatures of 20° C. and higher. At 20° C., the drying and curing process is slow, becoming more rapid as the temperature is raised. For the production of fibers it is desirable to use temperatures near 100° C. Under some circumstances air heated as high as 150° C. may be used to dry and cure the compositions.

The formaldehyde shown in the example may be replaced in whole or in part by acetaldehyde. Propionaldehyde and butyraldehyde or isobutyraldehyde may be substituted for part of the formaldehyde or acetaldehyde, but their limited solubility in water prevents their use as the sole insolubilizing agent.

The solutions of this invention are either neutral or slightly acid. The insolubilization occurs in these solutions without added catalyst. If desired, however, small amounts of acid catalysts may be used.

The process of this invention is limited to the ammonium salts of the above-described polystyrene polysulfonic acids. The free acids and the alkali metal salts thereof do not become insoluble under the conditions set forth above.

If desired, pigments, colors, lubricants, plasticizers, etc. may be dissolved or suspended in the aqueous solutions prior to the forming and insolubilization steps.

The process of this invention provides water-insoluble, infusible, non-burning films and fibers of sulfonated polystyrenes. The solutions may also be used to impregnate fibers, paper, and textiles which, after curing of the resin, no longer support combustion.

It is obvious that variations may be made in the products and processes of this invention without departing from the spirit and scope thereof as defined in the appended claims.

What is claimed is:

1. A water-insoluble infusible derivative of sulfonated polystyrene prepared by mixing formaldehyde with an ammonium salt of polystyrene polysulfonic acid in aqueous solution and removing the water at a temperature of at least 20° C.

2. A product as in claim 1 wherein the molecular weight of the polystyrene is about 70,000.

3. A product as in claim 1 wherein the polystyrene polysulfonic acid contains an average of 1.2 sulfonic acid groups per styrene unit.

4. A process for preparing water-insoluble infusible derivatives of sulfonated polystyrene which comprises mixing an ammonium salt of polystyrene polysulfonic acid with formaldehyde in aqueous solution and drying the solution thus prepared at a temperature of at least 20° C.

5. A process as in claim 4 wherein the polystyrene has a molecular weight of about 70,000.

6. A process as in claim 4 wherein the polystyrene polysulfonic acid contains an average of 1.2 sulfonic acid groups per styrene unit.

JOEL FANTL.

No references cited.